United States Patent
Collart et al.

[15] 3,656,855
[45] Apr. 18, 1972

[54] OPTICAL POSITION DETECTOR

[72] Inventors: Webber I. Collart, Rocky River; Tom L. Galanis, Mentor, both of Ohio

[73] Assignee: Harvey Hubiell Incorporated, Bridgeport, Conn.

[22] Filed: Mar. 23, 1970

[21] Appl. No.: 21,875

[52] U.S. Cl. .......................356/167, 250/83.3 H, 250/219 L
[51] Int. Cl. ......................................................G01b 11/00
[58] Field of Search..............250/202, 236, 83.3 H, 219 WD, 250/219 LG, 219 L; 356/167

[56] References Cited

UNITED STATES PATENTS

| | | | |
|---|---|---|---|
| 3,532,887 | 10/1970 | Clark | 250/219 LG X |
| 3,457,422 | 7/1969 | Rottman | 250/219 WD |
| 3,277,772 | 10/1966 | Atwood | 250/236 X |

*Primary Examiner*—James W. Lawrence
*Assistant Examiner*—Davis L. Willis
*Attorney*—Baldwin, Egan, Walling & Fetzer

[57] ABSTRACT

An optical position detector for monitoring the position of a radiating hot object such as a metallic heat emitting hot bar and/or rod product in a metal rolling mill, the monitoring detector including a scanning head having a rotating lens system that is focused on a heat sensitive photocell and which scans the position occupied by the hot object and develops a detection signal that is proportional to said occupied position. The sensing head also produces a reference signal. The reference signal and object detection signal are phase related so as to generate an analog signal which is then representative of the detected position of the object being monitored, and which may be utilized as a control signal in the rolling mill.

6 Claims, 5 Drawing Figures

PATENTED APR 18 1972

INVENTORS
WEBBER I. COLLART
TOM L. GALANIS

Baldwin, Egan, Walling & Fetzer
ATTORNEYS

OPTICAL POSITION DETECTOR

This invention relates generally to an electronic monitoring instrument capable of detecting the position of an object, as for example a heated iridescent rod or bar moving through a fabricating process such as in a metallic rolling mill.

As merely one example to which this monitoring instrument is especially adapted said instrument may be utilized in a rod rolling mill where it is disposed to view a section of the hot rod as it moves from station to station, as for example a loop formed as the rod is passed from two rolling mill stations that are disposed in side-by-side relation to each other. The monitoring instrument detects the position of the rod loop between the two rolling mills and is capable of sensing the movement of the loop toward or away from said stations which may be caused by a difference in the speed in either mill station. The monitoring instrument is capable of generating a control signal that may be then used to regulate the speed of either mill and to thereby assure the proper rolling process for the rod material.

It is therefore a primary object of the present invention to provide an electronic monitoring instrument capable of detecting the position of an object while it is moving through a fabricating process.

Another object of the present invention is to provide an electronic monitoring instrument which is disposed remotely to an object that is moving through a fabricating process, the instrument being capable of detecting the position of the object and to provide a signal to regulate the rate of movement of said object through said process.

Another object of the monitoring instrument of the present invention is to provide an instrument especially designed for detecting the position of a heat radiating body such as a hot rod or strip in a rolling mill in which mill the rod or strip is formed to have a loop between successive rolling mill stations disposed in side-by-side relation, the instrument herein being capable of detecting the presence of and any change in the position of the loop so as to regulate the rate of movement of said rod and/or strip by and through said mill stations to thus maintain the loop in a preselected position between said stations.

Additional objects and advantages of the present invention will be realized by one skilled in the art to which it pertains and upon reference to a preferred embodiment thereof as is illustrated in the accompanying drawings wherein.

Figure 1:
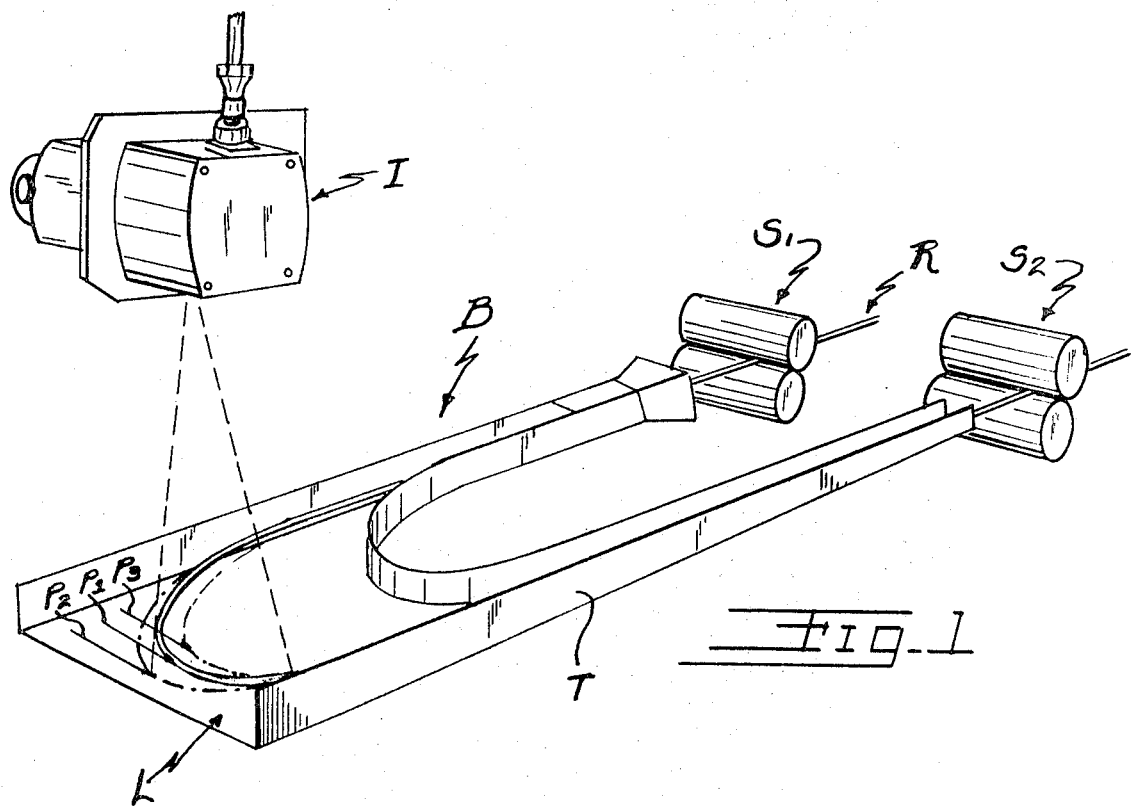
FIG. 1 is a partial schematic view showing the monitoring instrument of the present invention disposed above a rolling mill which has two rolling mill stations S1 and S2 in side-by-side relation; the instrument being positioned to detect and monitor the loop L formed by the rod material moving between said mill stations.

With reference directed to FIG. 1 there is shown a part of a metallic rod mill B which includes two rolling mill stands S1 and S2 disposed in side-by-side location. The rod material R is passed between the rolls of each mill stand in such manner that a closed-end loop L is formed therebetween which is supported on a tray T.

In the rod mill it is desired to monitor and maintain the position P1 of the loop L in the position illustrated whereby it is determined that each rod mill stand is moving the rod R therethrough at the desired proper speed. If the loop L moves away from the stands S1 and S2 to position P2 for example, one of the mill stands is moving the rod at a slower rate than the other. Likewise, if the loop L moves toward the stands S1 and S2, this indicates that one or both stands has increased its rate of movement of said rod.

The detection instrument of the present invention is operable to detect the presence of the loop L, its movement away from its preferred position P1 and to provide a control signal which may then be used to regulate the rate of movement of the rod by the mill stands S1 and S2.

As seen in FIG. 1, the detection instrument I is disposed above the loop L whereat it may view, detect and monitor the movement, if any, of said loop L.

As will be hereinafter apparent, the instant detection instrument may be positioned in other positions relative to the object to be monitored and its position or location and function in the same or equivalent manner as will be hereinafter more fully explained.

Figure 2:
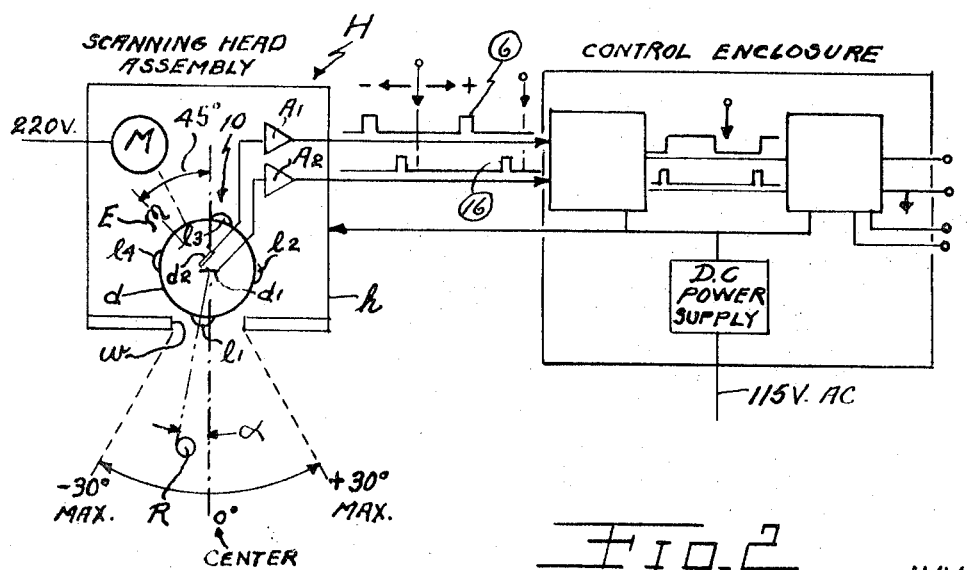
FIG. 2 is a schematic view of the instrument of the present invention showing the scanning head assembly and its associated control circuitry for generating the control signals thereof.

The detection instrument I includes a scanning head that is shown diagrammatically at H in FIG. 2, and which includes a rotating lens system 10 which focuses upon a highly sensitive infrared detector $d_1$ located at the center of rotation of the lens system.

The lens system is rotatably driven by an electric motor M about an axis that is substantially parallel with the plane through which the rod material passes.

The lens system has four lenses ($l_1$–$l_4$) spaced approximately 90° apart from each other and which are mounted on a drum d which is rotatable on said axis.

The infrared detector $d_1$ is disposed on said drum d at the center of rotation thereof.

As the lens system is rotated, the light radiation from the rod material is focused into the detector $d_1$ by and each time one of the lenses is disposed within the window opening w of the housing h for the scanning head.

As shown in FIG. 2 the window opening w is formed so that the lens system may scan an angle of 30° from either side of the optical center position of the scanning head, which position is identified at 0° center.

If the rod material R, which is shown in FIG. 2 to be at an angle $\alpha$ with respect to the center position, is within the window opening, a signal will be generated by the infrared detector $d_1$, the time and occurrence of which is proportional to the angular position $\alpha$ of the rod material R.

The scanning head also includes a second infrared detector $d_2$ and a source of illumination operable therewith, such as lamp E.

The detector $d_2$ is shown to be disposed adjacent detector $d_1$ and at an angle of 45° from the optical center 0°. Likewise the lamp E is disposed exteriorly of the drum d and also at approximately an angle of 45° from optical center. Lamp E provides a reference light for detector $d_2$ which is interrupted by the lens drum d four times per revolution of the drum.

The reference lamp E as positioned 45° from the optical center line gives a light pulsation each time a lens passes between it and the reference detector $d_2$. Through this arrangement the reference signal is 45° above optical center and the bar signal may be anywhere between plus or minus 30° above optical center to give a dead band of 15° from optical center so that the reference signal may set up the electronic measurement circuit prior to any bar signal. The motor M driving the lens drum need only be some reasonably constant RPM motor, DC/AC Synchronous, a Synchronous, or any other type of motor that provides fairly good speed regulation.

Figure 3:
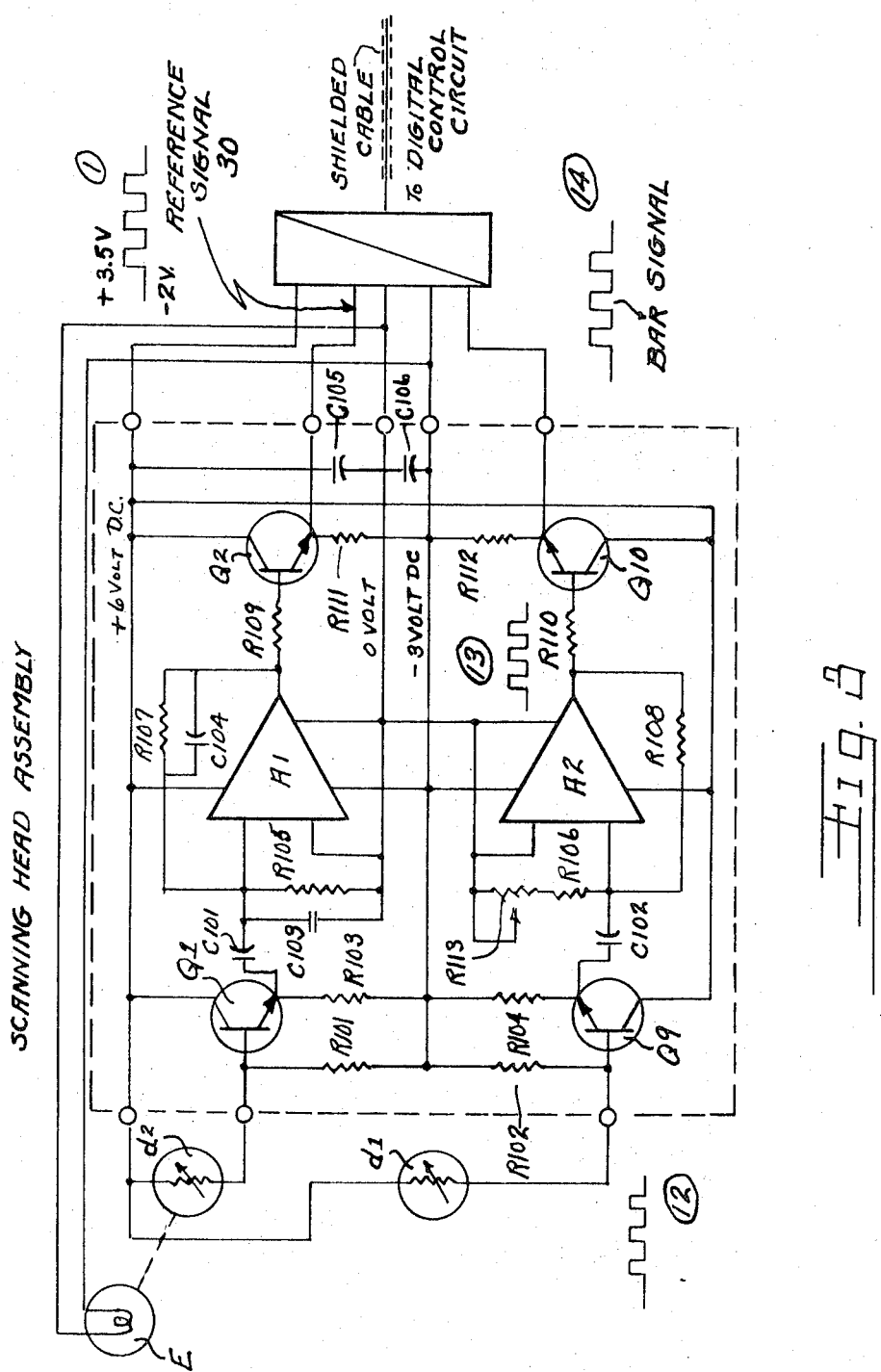
FIG. 3 is a schematic wiring diagram of the scanning head assembly.
Figure 4A:
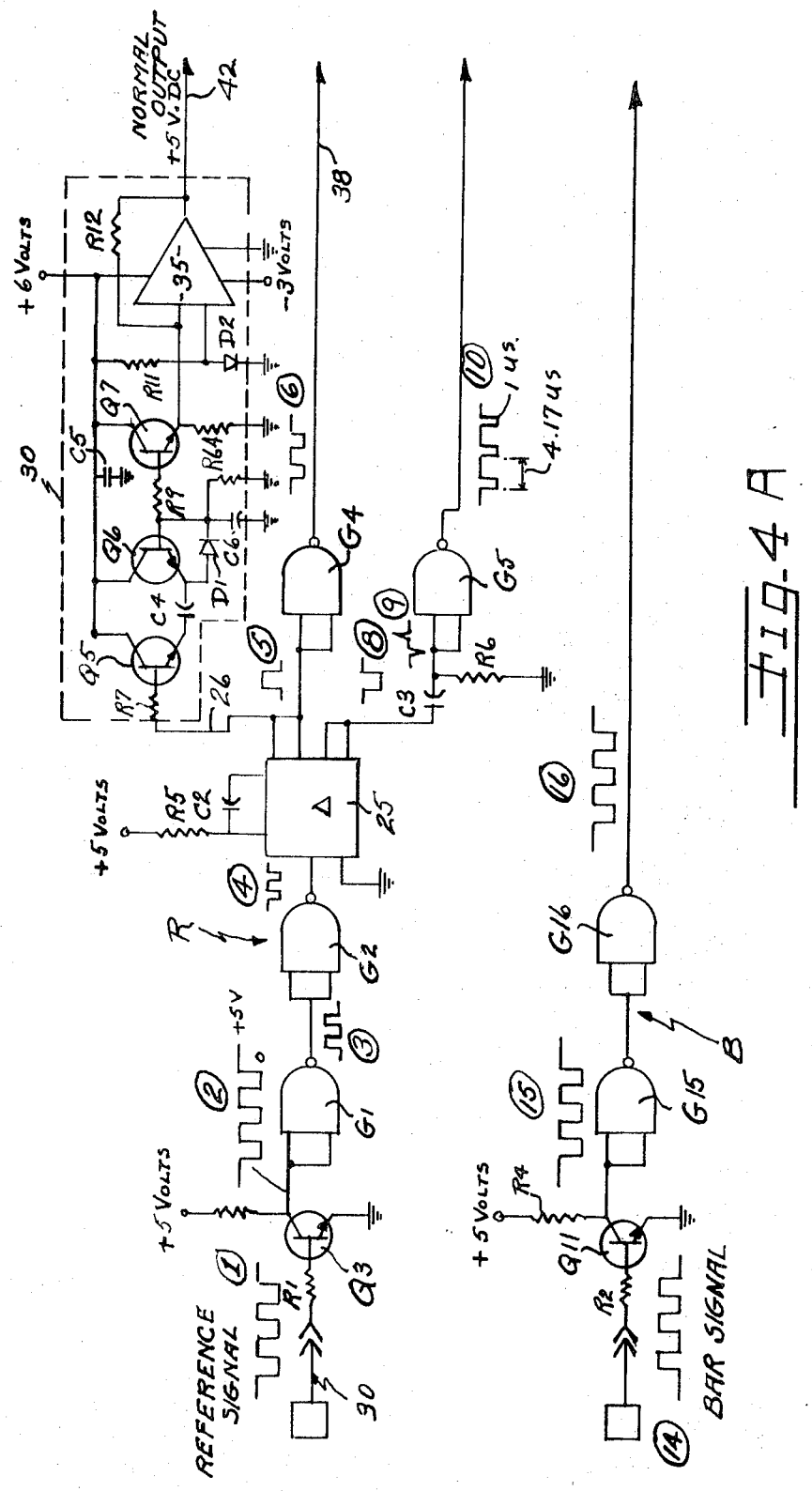
FIGS. 4A and 4B are schematic wiring diagrams of the control circuitry associated with said scanning head.

With reference now directed to FIGS. 3 and 4A and B the electrical circuitry for the scanning head assembly (FIG. 3) and the signal digital control circuit (FIGS. 4A and B) are shown.

The scanning head circuitry comprises the previously described lamp E and the detector $d_2$ which is connected to the base of transistor Q1 connected as an emitter follower. The output of transistor Q1 is connected to the input of a conventional solid state voltage comparator A1 such as the NE518A comparator presently manufactured by Signetics, Inc., the amplified output of which is connected by emitter follower Q2 and conductor 20 to the base of transistor Q3 connected in its common emitter mode, said transistor Q3 defining the input to the digital control circuitry of FIG. 4A.

With the scanning head assembly as thus described being connected to a conventional power supply for providing the indicated magnitudes of DC voltage thereto and with the values of the components identified therein and which are hereinafter tabulated, a reference signal or pulse is generated each time one of the lenses $l_1-l_4$ in the drum d is interposed between the lamp E and the detector $d_2$.

The reference signal is thus comprised of repetitive pulses of approximately 0.8 ms. duration of the configuration illustrated at (1) in the waveform diagram of FIG. 3, with the pulse separation being approximately 4.17 ms. leading edge to leading edge as also shown in FIGS. 3 and 4A. The leading edge of a reference pulse is a positive transition, switching from −2 to +3.5V at the input of the reference control circuit which is transistor Q3 in FIG. 4A.

Figure 4B:
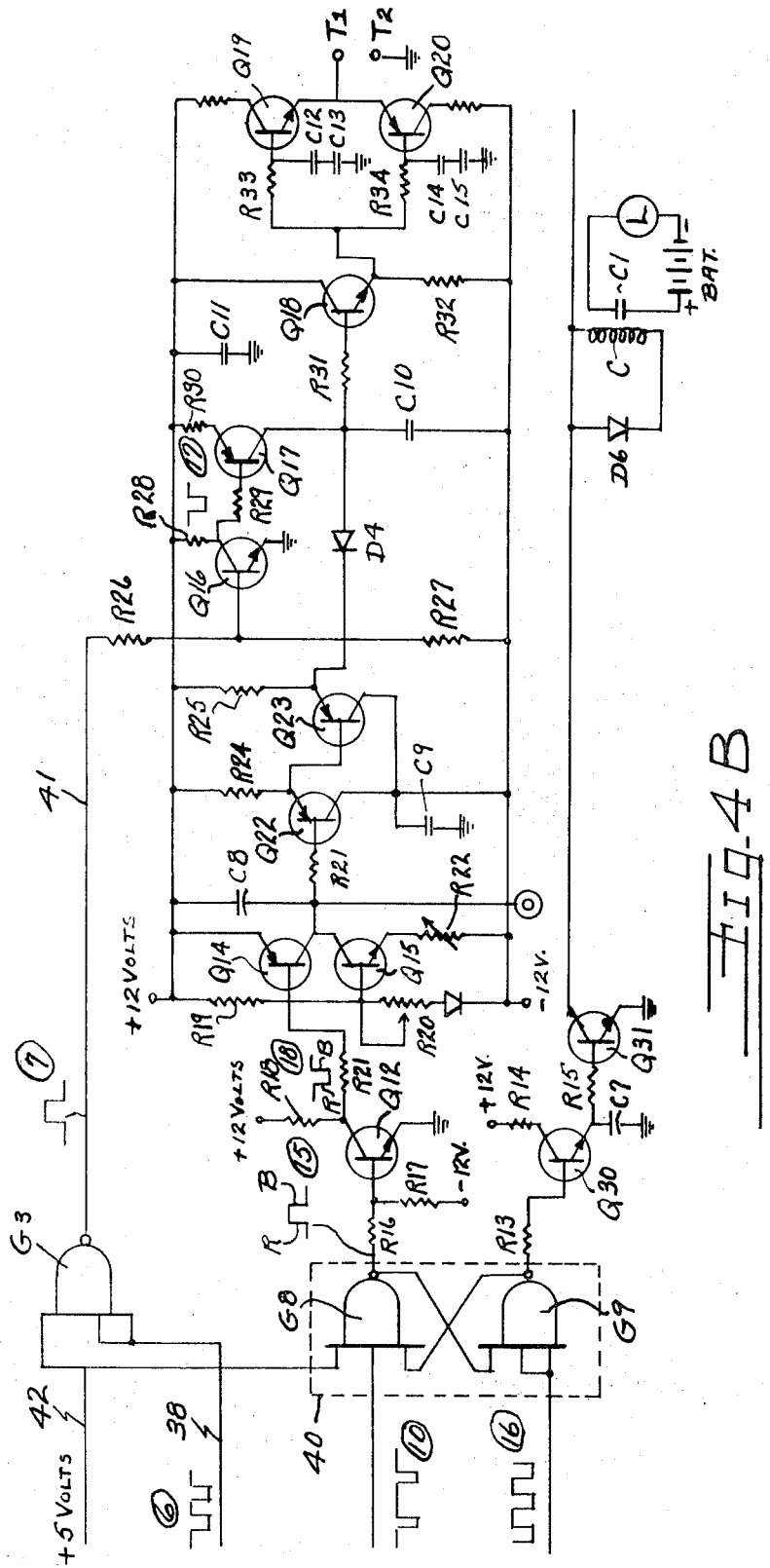

The control circuit includes a reference signal circuit identified at R in FIGS. 4A and 4B and a bar signal circuit part as identified at B.

The reference signal circuit part R comprises the aforesaid transistor Q3 defining the input to said circuit, connected in its common emitter mode and having its collector electrode connected conductively to the commonly connected pair of input terminals of a conventional NAND-gate G1. The output terminal of NAND-gate G1 is serially connected to the commonly connected pair of input terminals of a second NAND-gate G2; the output of which is connected to the input of a monostable Flip-Flop circuit of conventional assembly as identified schematically at 25.

With this circuitry, as the rising edge of the reference pulse (1) from the scanning head output Q2 increases above its 0 volt level, transistor Q3 is biased into saturation causing its collector voltage to fall from +5 volts to nearly 0 volts as seen at (2) in FIG. 4A. As the pulse continues, the collector voltage is of the same configuration but of opposite or inverted waveform.

This voltage waveform as applied to the input of NAND-gate G1 forces the output thereof to rise from 0 volts to +5 volts to thus result in the pulse train as seen at (3) in FIG. 4A which is likewise of inverted waveform with respect to the input waveform (2).

The pulse waveform (3) as applied to the NAND-gate G2 causes said gate to again invert the waveform to provide waveform (4) of like configuration, the voltage level thereof varying between approximately +5 volts and 0 volts D.C.

This negative going pulse waveform (4) is applied to the input of monostable multivibrator identified at 25 which is of conventional construction and which may be of the type hereinafter referred to in the accompanying component table.

The negative going leading edge of the pulse triggers the multivibrator effective to generate a 50μ output pulse identified at (5). Resistor R5 and capacitor C2 provide the RC time constant so as to produce the proper duration for the output pulse (5) which is a positive going square wave pulse of 50μ second duration.

The positive going pulse train (5) is applied by conductor 26 to the input (emitter follower Q5) of a frequency sensitive switch identified in its entirety the reference numeral 30. This switch includes transistor Q6 which is connected differentially with transistor Q5, the emitters of which are capacitively interconnected, the base electrode of Q6 being conductively coupled to the base of emitter follower Q7.

Capacitor C6 and resistor R64 connected to the base of transistor Q6 determine the frequency at which the switch 30 may operate.

A preferred frequency for said switch is approximately 3,600 cycles to thus make it substantially insensitive to changes in the frequency of the line voltage.

The emitter output of follower Q7 is connected to one input terminal of voltage comparator identified at 35 which may be of any conventional solid state construction such as the NE518A comparator manufactured presently by Signetics Inc. As seen in FIG. 4A comparator 35 is connected to regulated sources of DC voltage of −3 volts and +6 volts direct current, and as will be understood in the art the voltage input to said comparator 35 from the emitter follower Q7 is compared with the voltage standard established in the comparator 35 to thereby provide a normal voltage output level for the latter.

In the present system, the normal voltage output level of switch 30 is +5 volts direct current, which, as will be hereinafter understood, indicates the proper speed for the scanning motor M, and the generation of the reference pulse train (5) by the reference signal generating part R of the control circuit.

The voltage output (+5 volts DC) from switch 30 is connected through conductor 42 to one input terminal of a NAND-gate G3. The remaining input terminals of gate G3 are connected together and likewise connected by conductor 38 to the output of a NAND-gate G4. Said gate G4 is connected at its paralleled inputs to the output of multivibrator 25 to thus receive therefrom the positive-going pulse train (5) which is inverted thereby to provide the negative-going pulse train (6).

The low voltage pulse (6) from gate G4 forces the output of NAND-gate G3 to switch from 0V to +5V for the 50 μs. duration of pulse (6). This voltage pulse/switches level converter Q16 from cutoff to saturation providing a negative-going pulse (17) from +12V to 0V at the collector of Q16. The falling edge of this pulse is directly related by time to the leading edge of the reference pulse (1) arriving at the input to transistor Q3. Although the reference input pulse is approximately 800 μ seconds in duration, the pulse width at the collector of Q16 is limited to 50 μs by the one-shot operation of multivibrator 25. This pulse is referred to as the "sample" pulse. The one-shot multivibrator 25 has a second output pulse identified at (8) in FIG. 4A which is a negative-going pulse, the voltage level of which drops from +5V to 0V for 50 μs., then rises to the +5V level again, until the next reference pulse arrives more than 4 milli seconds later.

This one-shot output pulse (8) is capacitive coupled through capacitor C3 to NAND-gate G5. Because of capacitor C3 and resistor R6 the falling leading edge of this pulse creates a negative-going voltage (9) at the input to said gate G5 spike driving the same below 0V. The low resistance of R6 sharply attenuates this spike both in amplitude and duration. This minus voltage does not affect the output state of gate G5 and that output remains high at this time.

At the end of the 50 μs. pulse the voltage at the output of multivibrator 25 quickly rises to the positive state. This rising transition is coupled through capacitor C3 to the input of gate G5, creating a positive spike on the input and thereby causing the output of said gate to fall to 0V for approximately 1 μ second.

The control circuitry also includes a flip-flop of conventional design identified at 40 in FIG. 4B which comprises two NAND-gates G8 and G9 interconnected or cross-coupled at their respective inputs and outputs as shown which is effective as will be understood to provide for latching said gates in either two states or levels identified as high and low.

As previously mentioned, the output of the comparator 35 is approximately +5 volts DC under normal conditions with the scanning motor M running at a proper speed and with the reference pulse train (1) generated by the scanning head.

This voltage output (+5 volts DC) from said comparator 35 is applied through conductor 42 as seen in FIGS. 4A and 4B to the input of gate G8 of the flip-flop 40 to thus enable the same.

With this enabling voltage thus applied, the 1 μ second pulse (10) from gate G5 actuates gate G8 and forces its output to the high level. The output of gate G8 is cross-coupled to the input of gate G9 so that the flip-flop is latched in said state such that the output of gate G9 is held low. This low voltage level when cross-coupled to the input of gate G8 causes the output thereof to remain in the high state after the 1 μ (low level) pulse returns to its normal (high) state, forming the latch. This flip-flop 40 will remain in this position until actuated by the signal next generated by the presence of a bar loop.

The operation of the bar signal circuit B is compatible to that of the reference circuit R, the only difference being the "-time difference" between the occurrence of the reference signal and that of the bar signal.

The time difference is derived from the angular deviation of the hot object (bar) with respect to the optical axis of the scanning head as previously mentioned.

As seen in FIG. 4A, the bar signal is also a positive-going pulse train, one pulse being generated each time one of the lenses ($l_1$-$l_4$) is interposed between the hot irradiating bar R and the detector $d_1$.

The pulse width of the bar signal is not ordinarily as wide as the reference signal (1) but this is insignificant as far as circuit operation is concerned. Actually, the bar pulse width is proportional to the angular height of the hot object detected by the scanning head.

The detector $d_1$ is actuated to provide the pulse train bar signal as identified at (12) in FIG. 3 which is then applied to the base input of transistor amplifier Q9. Said amplifier is capacitively coupled by capacitor C102 to comparator A2 which is identical to comparator A1 previously mentioned.

The output of comparator A2 is a positive-going pulse train identified at (13) in FIG. 3 which is applied to emitter follower Q10, the output signal therefrom likewise being a pulse train as identified at (14) which varies from a −2 volts DC to +3.5 volts DC This bar signal pulse train (14) is then applied to the base input of transistor amplifier Q11, the output therefrom being thus inverted and amplified as indicated at (15) and which is then applied serially to NAND-GATES G15 and G16 wherein the output pulse train from the latter as identified at (16) in FIG. 4A is a low level series of pulses falling from +5 to 0V for the duration of the signal, then rising back to +5V DC It will be remembered that G8 of flip-flop 40 was toggled into the high state by the previous reference signal and latched by the cross-coupled output of associated part G9 of said flip-flop. The bar signal (16) is applied to the input of G9 of said flip-flop and its falling leading edge of the pulse forces the output of G9 to its high state. The output of G9 is coupled back to the input of G8 and since at this instant all of the inputs of G8 are high the output thereof is switched to its low state. With the output of G8 cross-coupled to the input of G9 the latter is latched in the high state after the bar pulse signal returns to its normal high state.

Looking at the output of G8 as identified at (15) it is a square wave signal that rises on the reference signal and falls on the bar signal. This square wave signal (15) is then fed to transistor Q12 which is operable as a signal level converter such as in addition to converting the signal level from 0 to +5V to 0 and +12V, it also provides a polarity inversion which occurs at the collector of Q12. By such inversion the reference signal produces the falling edge of the output pulse (18) and the bar signal produces the rising edge of said square wave pulse. This square wave (18) is then fed to transistor Q14, FIG. 4B which simply acts as a switch.

Transistor Q15 is a constant current source which permits capacitor C8 connected across the emitter-collector of Q14 to charge in a linear manner. Potentiometer R20 connected between the base of Q15 and the −12V DC source provides the correct current requirement under the circuit parameters and tolerances established by usage of the components identified in the attached component table.

When the pulse train (6) is applied to NAND-GATE G3, FIG. 4B in the presence of the +5 volt signal from voltage comparator 35, said gate G3 provides an inverted positive-going pulse (7) at its output which is also referred to as the "-sample pulse" and which likewise is applied by conductor 41 to the base input of transistor Q16 acting as a switch. Switch Q16 inverts said pulse train (7) to provide a negative-going pulse train identified at (17) in FIG. 4B which is then applied to the base of transistor Q17 which is connected across the ±12 volt DC supplies and acts as a current limiter. The output (collector electrode) of Q17 is connected, in turn, to the base of emitter follower transistor Q18, the output of which, in turn, connects to the base electrodes of transistors Q19 and Q20, the inputs and outputs of which are connected in parallel to thereby provide for a parallel output driver.

The output terminal T1 of the transistors Q19, Q20 which connect with the commonly connected emitters thereof may be used with the instrument ground terminal T2 to connect said instrument to a customer's control such as, for example, a conventional variable speed control for the rolling mill drive to thus change the speed that the rod is passed whereby the rod loop L is repositioned at its desired position.

Referring to the operation of transistor switch Q16 the 50 $\mu s$. "sample" pulse occurs prior to the reference transition of the square wave output pulse (18) from Q12. This sample pulse is used to turn on Q17 and provides collector current in an attempt to charge capacitor C10 connected between the collector of Q17 and the −12 volt DC source. Because of the short duration (50 $\mu s$.) and current limiting function of resistor R30 in the emitter circuit of Q17, a single "sample" pulse can only charge C10 a few tenths of a volt. However, because of the frequency of the "sample" signal only a fraction of a second is needed to charge C10 completely, providing no other signals influence this storage.

The voltage charge on C10 is sensed by emitter-follower Q18 connected across said capacitor C10 and provides a current gain to drive the output transistors Q19 and Q20.

Transistors Q22 and Q23 which function as emitter followers are shown serially connected to the collector circuit of Q14 and Q15. The output of emitter follower Q23 is connected through diode D4 to the base of emitter follower Q18.

When the square wave signal (18) is present at the base of Q14 the falling leading edge (reference) biases the transistor into saturation, clamping the collector junction of Q14 and Q15 to nearly +12V DC. This discharges any potential charge that may have been on C8. The emitter followers Q22 and Q23 are reversed biased under this condition so the emitter of Q23 is at +12V DC. This potential reverse biases diode D4 so that capacitor C10 cannot charge through R25 and the voltage across C10 is maintained and available at the DC output terminal T1 for the duration of this condition.

When the bar signal (18) initiates the rising edge of the square wave signal (18) to the base of Q14 the collector-emitter junction thereof is effectively an open circuit and no longer clamps the collector of Q15 to +12V. This allows capacitor C8 to begin charging at a rate that is determined by the constant current source Q15.

The longer capacitor C8 is allowed to charge the more negative the voltage will be at the lower end of said capacitor C8 with respect to +12V DC.

As said capacitor C8 is charging in a negative direction (from +12 V DC toward −12V DC) an equivalent voltage is produced at the emitter of follower Q23.

If the voltage on the emitter of Q23 is more negative than the stored charge of C10, diode D4 is forward biased and allows C10 to discharge quickly through the low emitter-collector resistance of Q23 to that voltage.

Capacitor C8 will continue charging until the reference signal, the falling leading edge of the square wave (18) at the base of Q14, again clamps Q14 and Q15 collectors to +12V DC But before this reference signal occurs at the base of Q14, the "sample" pulse is generated 50 $\mu s$. earlier. As explained, this "sample" time will try to charge capacitor C10 through Q17 and resistor R30. Because of the selected circuit parameters the effective charge of C will be limited to the voltage at the emitter of Q23. That is, during the sampling time 50 $\mu s$. before the reference transition affecting Q14 by pulse (17) capacitor C10 will either continue discharging through Q23 or charge through Q17 to the emitter voltage of Q23.

At the end of the 50 $\mu$ second sample time the reference signal leading falling edge of pulse (18) will again bring the emitter voltage of Q23 to +12V DC but D4 being reverse biased eliminates further charging of C10.

Therefore, the voltage charge of C10 which is transferred to the DC output terminal T1 is equivalent to the negative peak voltage (with respect to +12V) that capacitor C8 is allowed to charge to, during the time interval between the bar signal and the next reference signal.

The charging rate of capacitor C8 is normally adjusted by potentiometer R22 which is connected into the emitter circuit of current limiter Q15 so that when the bar pulse (14) occurs in the middle of consecutive reference pulses (1) the DC output voltage of the control circuit at its output terminal T1 is zero (0V).

In this manner, if the bar pulse (14) occurs immediately after a reference pulse (1), the voltage output will be at some negative potential between 0 volts and −12 volts. Likewise, if the bar pulse (14) occurs immediately ahead of the next succeeding reference pulse (1), the voltage output will be at a positive potential level somewhere between 0 volts and +12 volts, the output voltage level (plus or minus) depending upon the position occupied by the bar loop R as detected by the rotating scanning head.

Transistors Q30 and Q31 which are shown in FIG. 4B to be serially connected to each other, transistor Q30 being an emitter follower and transistor Q31 an amplifier, form a bar "-presence" detector by sampling and integrating the square wave output from G9 of the flip-flop 40 which is in the high (+5V) state during the time interval between the bar pulse (16) and the next reference pulse (1).

Transistor Q31 may be connected to any suitable sensing device such as, for example, the coil C of a conventional relay, said relay having a pair of contacts C1 which are closed upon the energization of said coil. The signal output from Q31 upon the presence of the bar signal (16) being applied to transistor Q30 operates said relay coil C.

Any suitable signal device, such as lamp L, may be connected in circuit with contacts C1 and may be illuminated to indicate presence of the bar loop R.

The following list of components identified by their respective reference numerals as noted in the specification and drawings have been incorporated into the instrument as referred to herein:

COMPONENT LIST

C = Capacitor        G = Gate Device
R = Resistor
Q = Transistor
D = Diode

| SYMBOL | DESCRIPTION |
|---|---|
| C1, 5, 12–15, 105, 106 | CM-106 (10/10) Tantalum |
| C2, 4 | WMF1S15 (0.015/100) Mylar |
| C3 | 19FD202J03 2000 PF Silver Mica |
| C6 | WMF1S68 (0.068/100) Mylar |
| C7 | CT-335 (3.3/10) Tantalum |
| C8 | 192P-82392 (0.022/80) Metal film |
| C9, 11 | CL-106 (10/20) Tantalum |
| C10 | KIC35K (1/35) Tantalum |
| C101, 102 | WMF1P1 (0.1/100) Mylar |
| C103, 107 | CK-103 (0.01/50) Ceramic |
| C104 | 15FD101J03 (100PF) Silver Mica |
| D1, 4–6 | 1N5397 |
| D 2, 3 | 1N914 |
| 35 | NE518A Signetics |
| G3, 8, 9 | N8870A Signetics |
| G1, 2, 4, 5, 15, 16 | N8880A Signetics |
| 25 | N8162A Signetics |
| R1, 2, 16, 21, 26, 29, 32, 46, 109, 110 | 3.3K 1/4w |
| R3, 4, 8, 13, 15, 18, 23, 28, 31, 33, 34 | 1KΩ 1/4 w |
| R22 | 1KΩ Adj. 1/4w |
| R5 | 4.3KΩ 1/4w |
| R6 | 330Ω 1/4w |
| R7 | 2.7KΩ 1/4w |
| R9, 11 | 10KΩ 1/4w |
| R10 | 4.7KΩ 1/4w |
| R12, 101, 102, 107 | 1MΩ 1/4w |
| R14, 35, 36 | 47Ω 1/4w |
| R17, 19, 27 | 22K 1/4w |
| R20 | 63WR1K 1KΩ Trimpot |
| R24 | 30KΩ 1/4w |
| R25 | 1.8KΩ 1/4w |
| R30 | 100Ω 1/2w |
| R103, 104 | 330KΩ 1/4w |
| R105, 106 | 24KΩ 1/4w |
| R108 | 470KΩ 1/4w |
| R111, 112 | 270Ω 1/4w |
| R113 | 62PR50KΩ pot |
| R64 | 220K 1/4w |

Having thus described a preferred embodiment of optical detector of the present invention, it will be realized that the same is susceptible to various modifications, changes and/or combinations of parts without departing from the inventive concepts as are defined in the claims.

We claim:

1. An optical detector system for detecting the position occupied by an article relative to an optimum or reference position comprising optical scanning means rotatable about an axis and disposed in spaced relation to the reference position and being operable to optically scan said reference position and a predetermined angular zone on either side thereof, drive means actuating said scanning means to generate both a reference signal that is representative of said reference position and an article detection signal representative of the position occupied by the said article in said angular zone, and including detector means located at the center of rotation of said scanning means actuatable upon scanning the position occupied by said article for generating said article detection signal, circuit means for receiving said reference signal and said article detection signal, said circuit means including means for sensing the generation of the reference signal effective to define the start of a detection cycle with respect to time, means in said circuit means for sensing the generation of an article detection signal subsequent to said reference signal and being operable to terminate the detection cycle, signal storage means in said circuit means actuated at the start of said cycle by said reference signal and deactuated by said article detection signal at the termination of said cycle and operable to accumulate a signal representing the duration of the detection cycle, and means in circuit with said signal storage means for connecting said accumulated signal to indicator means to determine the magnitude thereof.

2. In an optical detector system as defined in claim 1 and wherein the signal storage means comprises means for accumulating a charge of electrical energy at a linear rate.

3. In an optical detector system as defined in claim 2 and wherein the storage means includes a capacitor in circuit with a switch device.

4. In an optical detection system as defined in claim 1 and wherein the circuit means includes flip-flop means operable to provide a signal of predetermined time duration.

5. In an optical detection system as defined in claim 1 and wherein the circuit means includes switch means actuatable by the generation of the reference signal.

6. In an optical detection system as defined in claim 1 and wherein the circuit means includes flip-flop means responsive to the generation of both the reference signal and the article detection signal.

* * * * *

PO-1050
(5/69)

UNITED STATES PATENT OFFICE
CERTIFICATE OF CORRECTION

Patent No. 3,656,855    Dated April 18, 1972

Inventor(s) Webber I. Collart and Tom L. Galanis

It is certified that error appears in the above-identified patent and that said Letters Patent are hereby corrected as shown below:

In the heading of the patent document, the assignee's name should read as follows:

Harvey Hubbell Incorporated, Bridgeport, Conn.

Signed and sealed this 3rd day of October 1972.

(SEAL)
Attest:

EDWARD M. FLETCHER, JR.
Attesting Officer

ROBERT GOTTSCHALK
Commissioner of Patents